United States Patent [19]
Hirose

[11] Patent Number: 4,563,038
[45] Date of Patent: Jan. 7, 1986

[54] MOTORCYCLE SEAT ASSEMBLY
[75] Inventor: Mutsuo Hirose, Saitama, Japan
[73] Assignee: Honda Giken Kogyo Kabushiki Kaisha, Tokyo, Japan
[21] Appl. No.: 518,011
[22] Filed: Jul. 27, 1983
[30] Foreign Application Priority Data
  Aug. 4, 1982 [JP] Japan ................. 57-136094
[51] Int. Cl.$^4$ ............................................. B62J 1/00
[52] U.S. Cl. ................................ 297/243; 297/201; 297/DIG. 9
[58] Field of Search .......... 297/201, 243, 311, DIG. 9
[56] References Cited
  U.S. PATENT DOCUMENTS 1,216,029  2/1917  Whitaker ..................... 297/243
  2,320,210  5/1943  Bender ..................... 297/243 X
  3,092,362  6/1963  Walsh ..................... 297/243 X
  3,269,773  8/1966  O'Connor ..................... 297/243 X
  3,406,772 10/1968  Aitrent et al. ..................... 297/339
  3,913,974 10/1975  Bowen ..................... 297/243 X
  4,462,634  7/1984  Hanagan ..................... 297/243 X

FOREIGN PATENT DOCUMENTS 709087  5/1954  United Kingdom ................. 297/243

Primary Examiner—William E. Lyddane
Assistant Examiner—Peter A. Aschenbrenner
Attorney, Agent, or Firm—Lyon & Lyon

[57] ABSTRACT

A seat assembly including an operator and a passenger seat for a motorcycle. The operator seat is adjustable in height by actuation of a fluid cylinder fixed at one end to the seat and at the other end to the motorcycle frame. The passenger seat is adjustable fore and aft by means of a track and runner assembly which may be either powered or manually operated. The passenger seat includes a backrest for the operator seat which is advantageously adjustable by this means.

10 Claims, 7 Drawing Figures

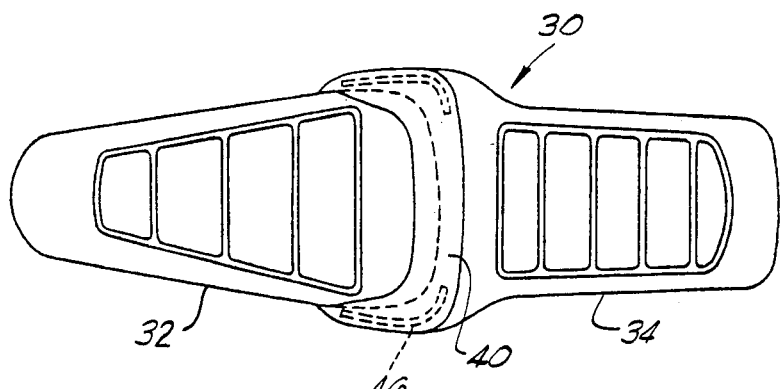
FIG. 4.
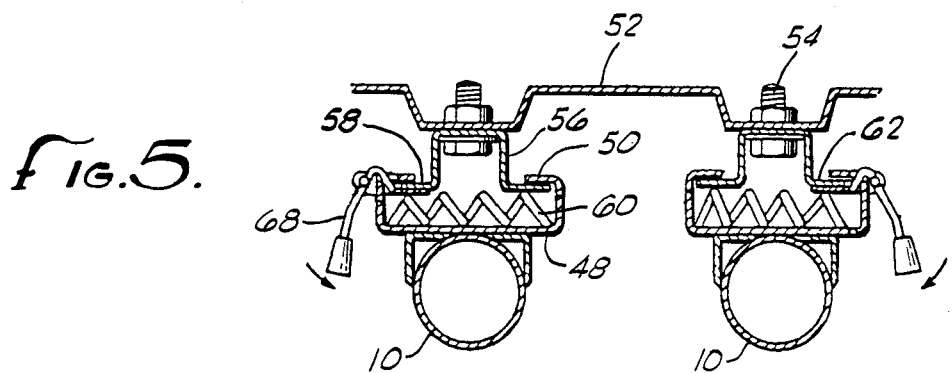
FIG. 5.
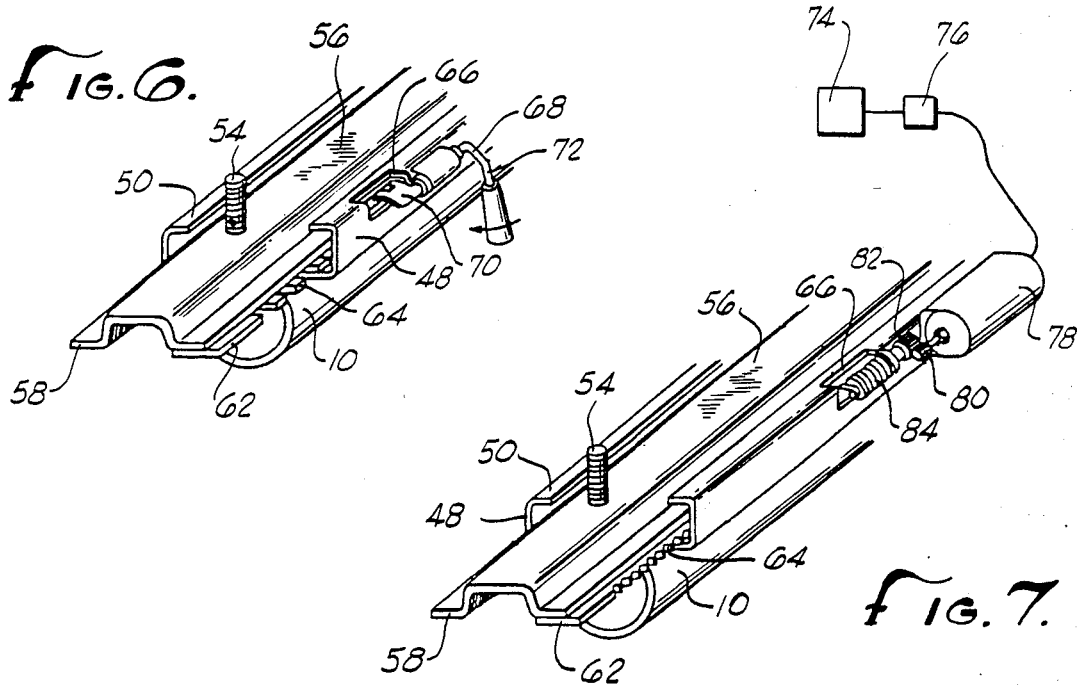
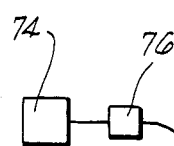
FIG. 6.
FIG. 7.

MOTORCYCLE SEAT ASSEMBLY

BACKGROUND OF THE INVENTION

The field of the present invention is seats for motorcycles.

Motorcycles of a size to accommodate the operator and a passenger often include either an extended single seat or two seats arranged in tandem. Such arrangements have proven to be highly satisfactory but do not provide for any adjustment to accommodate the size of the operator. Because of the great disparity in sizes between individuals who operate motorcycles, seat adjustment would be beneficial, particularly for the comfort of the operator.

SUMMARY OF THE INVENTION

The present invention pertains to a motorcycle seat assembly having two seats in tandem with seat adjustment for the operator. In accordance with a first aspect of the present invention, the second seat, or passenger seat, is adjustable fore and aft. This second seat may include a front end forming a backrest for the first seat. In this way, a backrest for the operator is provided and is adjustable. In a second aspect of the present invention, the first seat, or operator seat, is adjustable in height through adjustment vertically relative to the motorcycle. With either one or both of these adjustment features, the operator may select a comfortable and convenient position for operating the motorcycle.

A plurality of means are provided for adjusting the seat assembly. A track and runner assembly may be employed for the rear seat in conjunction with a lock. A fluid cylinder or cylinders may be employed to raise and lower the front seat. The front seat may also be pivotally mounted at its front end in cooperation with the fluid cylinder.

Accordingly, it is an object of the present invention to provide an adjustable seat assembly for a motorcycle. Other and further objects and advantages will appear hereinafter.

BRIEF DESCRIPTION OF THE DRAWINGS

FIG. 4 is a plan view of the seat of FIG. 1.

FIG. 5 is a cross-sectional elevation taken along line V—V of FIG. 2.

FIG. 6 is a detailed perspective of a runner and track assembly of the present invention.

FIG. 7 is a detailed perspective view of a second runner and track assembly of the present invention.

DETAILED DESCRIPTION OF THE PREFERRED EMBODIMENT

Figure 1:
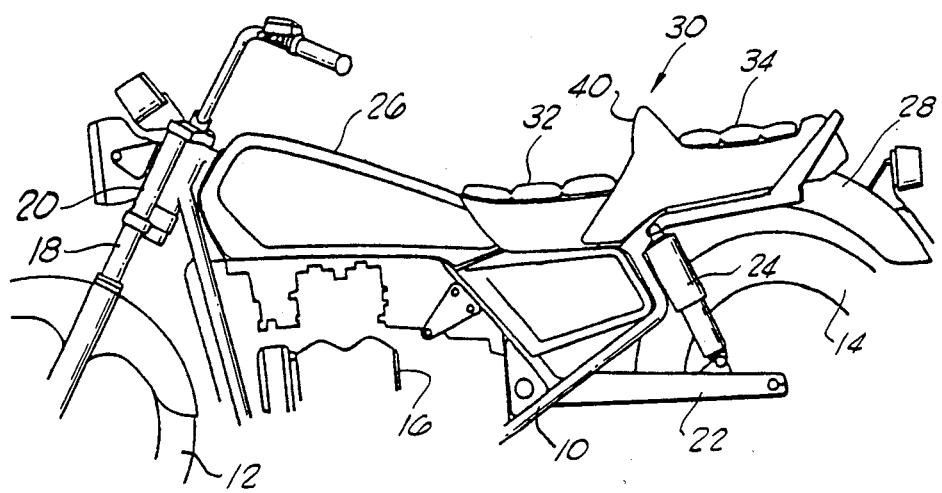
FIG. 1 is a side elevation of a motorcycle employing a seat assembly of the present invention.

Turning in detail to the drawings, FIG. 1 generally illustrates a motorcycle having a frame 10, a front wheel 12, a rear wheel 14 and an engine assembly 16 conventionally arranged. The front fork and steering assembly 18 includes a pneumatic cushion mechanism 20. The rear swing arm suspension assembly 22 includes a pneumatic cushion assembly 24 fixed at one end to the frame 10. Also placed on the motorcycle is a fuel tank 26 and a rear fender 28.

Mounted on the frame 10 of the motorcycle generally behind the fuel tank 26 and extending over the rear fender 28 is a seat assembly, generally designated 30. The seat assembly 30 includes a first seat or operator seat 32 and a second seat or passenger seat 34. The operator seat 32 is generally located ahead of the passenger seat 34 in tandem relation with the passenger seat 34 extending over a portion of the operator seat 32. This relationship can best be seen in FIGS. 2 and 3. Both seats 32 and 34 are appropriately cushioned in a generally conventional manner.

Looking first to the operator seat, the body of the seat 32 is illustrated, in this embodiment, to extend over the very back portion of the fuel tank 26 and over the upper frame member or members 10 of the motorcycle. The operator seat 32 is illustrated in the preferred embodiment to be pivotally mounted to the frame 10 about a pivot 36 located beneath and at the forward end of the operator seat 32. Because of the pivotal mounting at pivot 36, the operator seat 32 may pivot vertically as indicated by the arrow in FIG. 2. As a means for adjusting and retaining the operator seat 32 vertically, one or more fluid cylinders 38 are fixed to the lower rear portion of the operator seat 32. The fluid cylinder or cylinders are fixed at the other end to the frame 10 of the motorcycle. Through the application of appropriate fluid pressure or venting, the operator seat 32 may be raised or lowered.

As a means for providing fluid pressure to the pneumatic cylinder or cylinders 38, a pneumatic pump may be employed through a conventional pneumatic system including a control valve. In the preferred embodiment, the cushion members 20 and 24 are also pneumatically controlled and are preferably controlled by one or more control valves regulating pressure from a common pump. Thus, pneumatic pumps and systems would not require duplication for both the seat adjustment and the suspension. Where additional adjustment to the operator seat 32 is desirable, a similar fluid cylinder may be employed instead of the pivot 36. In this way, the front of the operator seat 32 might also be raised and lowered.

The passenger seat 34 includes a forward portion of increased size which is formed into a backrest 40 for the operator seat 32. The backrest 40 is designed to give lower back support to an operator who positions himself on the operator seat 32 against the backrest 40. A conventional seat configuration is provided aft of the backrest 40 for supporting a passenger on the motorcycle.

Figure 2:
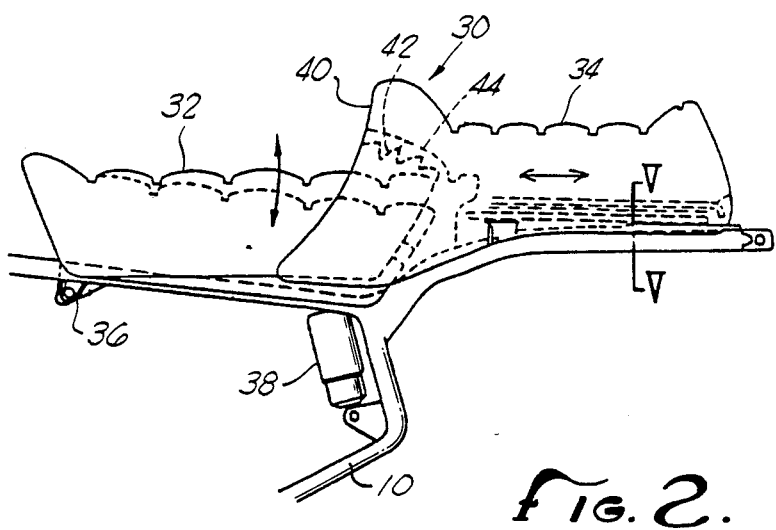
FIG. 2 is a detailed elevation of the seat assembly of FIG. 1.
Figure 3:
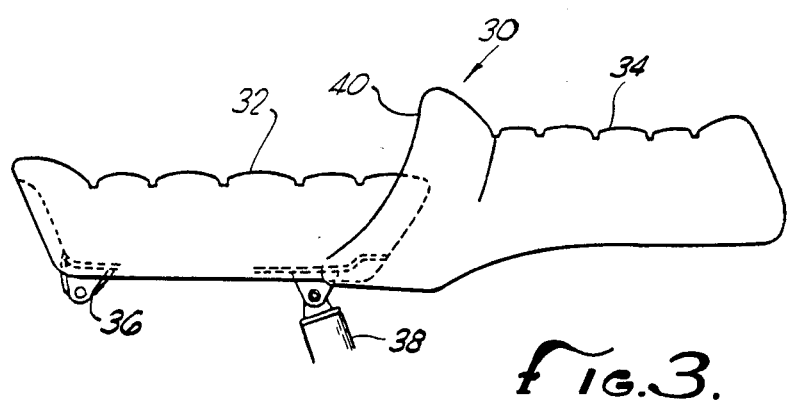
FIG. 3 is a detailed elevation of the seat assembly of FIG. 1 illustrating the mounting of the front seat.

At least the forward, enlarged portion of the passenger seat 34 is formed into an inverted channel which is positioned over and about the sides of the operator seat 32. Thus, as can be seen in FIGS. 2 and 3, the operator seat 32 is able to extend rearwardly into the channel portion of the passenger seat 34. A rubber seal 42 may extend between the operator seat 32 and the passenger seat 34 in this channel portion. The seal is shown to be corrugated to accommodate the adjustments of the seats. A fixed membrane 44 is also shown to be associated with the passenger seat 34 to close off the channel portion aft of the operator seat 32. Plate springs 46 are positioned about the channel portion of the passenger seat 34 so as to bias the flexible portion of the passenger seat 34 toward the operator seat 32 to close any gap therebetween.

Looking next to FIGS. 5 and 6, a means is illustrated for adjustably mounting the passenger seat 34 to the frame 10. Two parallel frame members 10 are shown to extend fore and aft on the motorcycle. To these frame members 10 are rigidly fixed two tracks 48. The tracks also extend fore and aft on the motorcycle and are generally C-shaped in cross section with retaining flanges 50 extending inwardly at the upper portion of the track 48. The passenger seat 34 includes an under frame 52 which is fixed by means of fastener assemblies 54 to runners 56. The runners 56 cooperate with the tracks 48 to form a runner and track assembly for fore and aft adjustment of the passenger seat 34. The runners 56 include outwardly extending flanges 58 which cooperate with the retaining flanges 50 to hold the passenger seat 34 in place. Coil members 60 provide a mechanism for facile relative movement of the runners 56 on the tracks 48.

To selectively lock the passenger seats 34 in place, a rack 62 is shown to be fixed to each runner 56. The rack 62 includes teeth 64 which pass by an access hole 66 through the track 48. A lock 68 is pivotally mounted to the track 48. The lock 68 includes locking pins 70 which extend selectively into interference with the teeth 64. A lever 72 is used to manually actuate the pins 70 for adjustment. Two locking mechanisms are shown in FIG. 5 and both must be actuated for adjusting the passenger seat 34. Where desired, conventional linkage between the locking assemblies 68 may be used so that one hand actuation is possible.

A modification is disclosed in FIG. 7 where identical numbers are employed in the drawings to represent corresponding elements. The modification illustrated in FIG. 7 is a powered drive for adjustment of the passenger seat 34. The power drive includes a battery 74, a switch 76 and a motor 78. By actuating the switch 76, the power of the battery may be directed to the motor 78 to drive a gear including a pinion 80 and gear wheel 82. The gear wheel 82 is fixed to a worm 84 which engages the teeth 64 of the rack 62. Naturally, where appropriate, a dual system for either manual or powered actuation may be employed.

The seat assembly thus disclosed provides adjustment generally affecting the position of the motorcycle operator. The operator seat is adjustable in the vertical direction to alter the height of the operator position. The passenger seat is adjustable fore and aft to alter the backrest position for the operator seat 32. Through actuation of one or both of the seat adjustments, an appropriate seating position can be obtained.

Thus, an adjustable two-place motorcycle seat is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A seat assembly for motorcycles, comprising
a first seat mounted on a motorcycle;
a second seat mounted on the motorcycle aft of said first seat and extending over a portion of said first seat, said second seat being adjustable fore and aft relative to said front seat, said second seat being in the form of an inverted channel extending over said first seat.

2. The seat assembly of claim 1 wherein said second seat includes a front end forming a backrest for said first seat.

3. The seat assembly of claim 1 wherein said second seat includes a track and runner assembly, said track being fixed to the motorcycle and said runner being fixed to said second seat, and a lock operably fixing said runner relative to said track.

4. The seat assembly of claim 1 wherein said first seat is pivotally fixed to the motorcycle and includes means for pivotally adjusting and fixing said first seat about said pivot.

5. The seat assembly of claim 4 wherein said pivotally adjusting and fixing means includes an air cylinder fixed to the motorcycle at a first end and fixed to the first seat at a second end.

6. A seat assembly for motorcycles, comprising
a first seat;
mounting means for mounting said first seat on a motorcycle, said mounting means being constructed and arranged to adjust vertically;
a second seat mounted on the motorcycle aft of said first seat and extending over a portion of said first seat, said second seat including a front end forming a backrest for said first seat.

7. The seat assembly of claim 6 wherein said second seat is adjustable fore and aft relative to said first seat.

8. The seat assembly of claim 6 wherein said means includes a fluid cylinder, one end of said fluid cylinder being fixed to the motorcycle and the other end of said fluid cylinder being fixed to said first seat.

9. The seat assembly of claim 8, wherein said first seat is pivotally mounted at the fore end thereof to the motorcycle, said fluid cylinder being fixed to the aft end of said first seat.

10. A seat assembly for motorcycles, comprising
a first seat mounted on a motorcycle with vertical adjustment;
a second seat mounted on the motorcycle aft of said first seat and extending over a portion of said first seat, said second seat being adjustable fore and aft relative to said first seat, said second seat including a front end forming a backrest for said first seat, said second seat being in the form of an inverted channel extending over said first seat.

* * * * *